US006691154B1

(12) United States Patent
Zhu et al.

(10) Patent No.: US 6,691,154 B1
(45) Date of Patent: Feb. 10, 2004

(54) INSTANTANEOUS REMOTE CONTROL OF AN UNATTENDED SERVER

(75) Inventors: Min Zhu, Los Altos Hills, CA (US); Zheng Yuan, San Jose, CA (US)

(73) Assignee: WebEx Communications, Inc., San Jose, CA (US)

( * ) Notice: Subject to any disclaimer, the term of this patent is extended or adjusted under 35 U.S.C. 154(b) by 0 days.

(21) Appl. No.: 09/515,684

(22) Filed: Feb. 29, 2000

Related U.S. Application Data

(63) Continuation-in-part of application No. 09/442,424, filed on Nov. 17, 1999, now Pat. No. 6,601,087.
(60) Provisional application No. 60/109,026, filed on Nov. 18, 1998.

(51) Int. Cl.[7] .............................. G06F 15/16; H02H 3/05
(52) U.S. Cl. ....................... 709/204; 709/205; 709/208; 709/209; 714/4; 714/39
(58) Field of Search ................................ 709/204, 205, 709/208, 209; 714/4, 39

(56) References Cited

U.S. PATENT DOCUMENTS

| | | | | |
|---|---|---|---|---|
| 5,408,600 A | * | 4/1995 | Garfinkel et al. | 395/153 |
| 5,751,958 A | * | 5/1998 | Zweben et al. | 395/200.34 |
| 5,781,703 A | * | 7/1998 | Desai et al. | 395/54 |
| 5,799,141 A | * | 8/1998 | Galipeau et al. | 395/182.81 |
| 6,009,461 A | * | 12/1999 | Yamano | 709/204 |
| 6,088,737 A | * | 7/2000 | Yano et al. | 709/235 |
| 6,185,683 B1 | * | 2/2001 | Ginter et al. | 705/52 |
| 6,256,661 B1 | * | 7/2001 | Terahama et al. | 709/201 |
| 6,343,313 B1 | * | 1/2002 | Salesky et al. | 345/751 |

FOREIGN PATENT DOCUMENTS

| | | | | |
|---|---|---|---|---|
| EP | 950971 A2 | * | 10/1999 | G06F/17/60 |
| JP | 08241276 A | * | 9/1996 | G06F/15/00 |

OTHER PUBLICATIONS

Mikio Takashi, Nobuhito Matsushiro, "Printer Simulator—Virtual Printer.", Aug./1998, OKI Technical Review, vol. 64. Special Issue on Printers: UDC 681.327.54'22.001.573.*

* cited by examiner

Primary Examiner—Patrice Winder
Assistant Examiner—Liang-Che A Wang
(74) Attorney, Agent, or Firm—Fish & Richardson P.C.

(57) ABSTRACT

A method and a computer program product, implementing techniques for exchanging data in an unattended desktop sharing mode. The techniques include receiving a conferencing request, at a local unattended server, from a remote conferencing server; loading a desktop application on the local unattended server in response to the conferencing request to generate a loaded desktop; sending the loaded desktop to a virtual device to create a shared desktop; and sending the shared desktop to the remote conferencing server for distribution to one or more remote computers, whereby the shared desktop is displayed at each remote computer by a viewer application.

34 Claims, 4 Drawing Sheets

INSTANTANEOUS REMOTE CONTROL OF AN UNATTENDED SERVER

CROSS REFERENCE TO RELATED APPLICATIONS

This application is a continuation-in-part of application Ser. No. 09/442,424, filed Nov. 17, 1999, now U.S. Pat. No. 6,601,087, on behalf of Min Zhu et al., entitled "Instant Document Sharing", which is incorporated herein by reference in its entirety, and which claims the benefit of U.S. Provisional Application No. 60/109,026, filed Nov. 18, 1998.

BACKGROUND OF THE INVENTION

The present invention relates to initiating a desktop controlling session of an unattended server from a remote site.

Computer networks are an integral part of most business organizations. Each organization's network links together computer systems that provide various enterprise functions, such as finance, accounting, payroll, sales, support, design, engineering, etc. Servers—network servers, file servers, print servers, or otherwise—are used to allocate the resources within a network. It is critical for an organization to have its servers available and running all the time. Typically, organizations invest significant resources in maintaining and supporting their servers. In some cases, the organization has an internal technical support center located on-site. However, in many cases, the organization relies on vendors to provide technical support on a need-basis. These vendors are often located off-site and do not have direct remote access to the servers for network security reasons.

Current servers provide a monitoring application that monitors the status of the server. When the monitoring application detects a potential problem, a message is sent to the vendor. The vendor dispatches technical support staff to the organization's site to resolve the problem. This process can take several hours or more depending on the availability and location of the vendor's technical support staff.

SUMMARY OF THE INVENTION

In general, in one aspect, the invention provides a method and a computer program product, implementing techniques for exchanging data in an unattended desktop sharing mode. The techniques include receiving a conferencing request, at a local unattended server, from a remote conferencing server; loading a desktop application on the local unattended server in response to the conferencing request to generate a loaded desktop; sending the loaded desktop to a virtual device to create a shared desktop; and sending the shared desktop to the remote conferencing server for distribution to one or more remote computers, where the shared desktop is displayed at each remote computer by a viewer application.

Embodiments may include one or more of the following features.

A user input from a remote computer can be received at the local unattended server. The user input can drive a file editing application associated with the desktop application to edit the loaded desktop based on the user input. A loaded desktop update can be received from the file editing application, the loaded desktop update occasioned by the editing of the loaded desktop. The loaded desktop update can be sent to a virtual device to create a shared desktop update. The shared desktop update can be sent to the remote conferencing server for distribution to one or more remote computers. This can result in updating the display of the shared desktop by the respective viewer applications.

A transparent overlay screen can be created, such that it appears to be displayed over the shared desktop. A user-defined object can be created at a user-specified position within the transparent overlay screen at a remote computer. Data representing the user-defined object and user-specified position can be sent from the remote computer to the remote conferencing server for distribution to one or more remote computers. This can result in the transparent overlay screen being updated to display the user-defined object at the user-specified position within the transparent overlay screen by the respective viewer applications.

The conferencing request can be generated by the remote conferencing server upon receipt of an event flag from the local unattended server. The event flag can identify an application on the local unattended server requiring external support.

Advantages that can be seen in implementations of the invention include one or more of the following. The invention enables one or more remote expert users to initiate a desktop controlling session of a local unattended server from one or more remote sites. Other advantages include the ability to launch a specific application on a local unattended server from one or more remote sites. With the present invention, it is possible for an application vendor to troubleshoot a specific application on a remote unattended server. Yet another advantage of the present invention is that it provides the ability to extend the server applications to remote users on demand. Thus, with the present invention, it is possible for a corporate user who is traveling outside the corporate network to access his or her computer desktop under certain prearranged circumstances. The corporate user could then remotely access his desktop and/or specific applications such as his email or specific documents and folders on the system without having to make, transmit, and maintain separate copies on other computers. Another advantage is that multiple users can perform these functions from separate and distinct locations. All this functionality is enabled through a simple user interface of a web browser or an application program that is easily available from any location.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
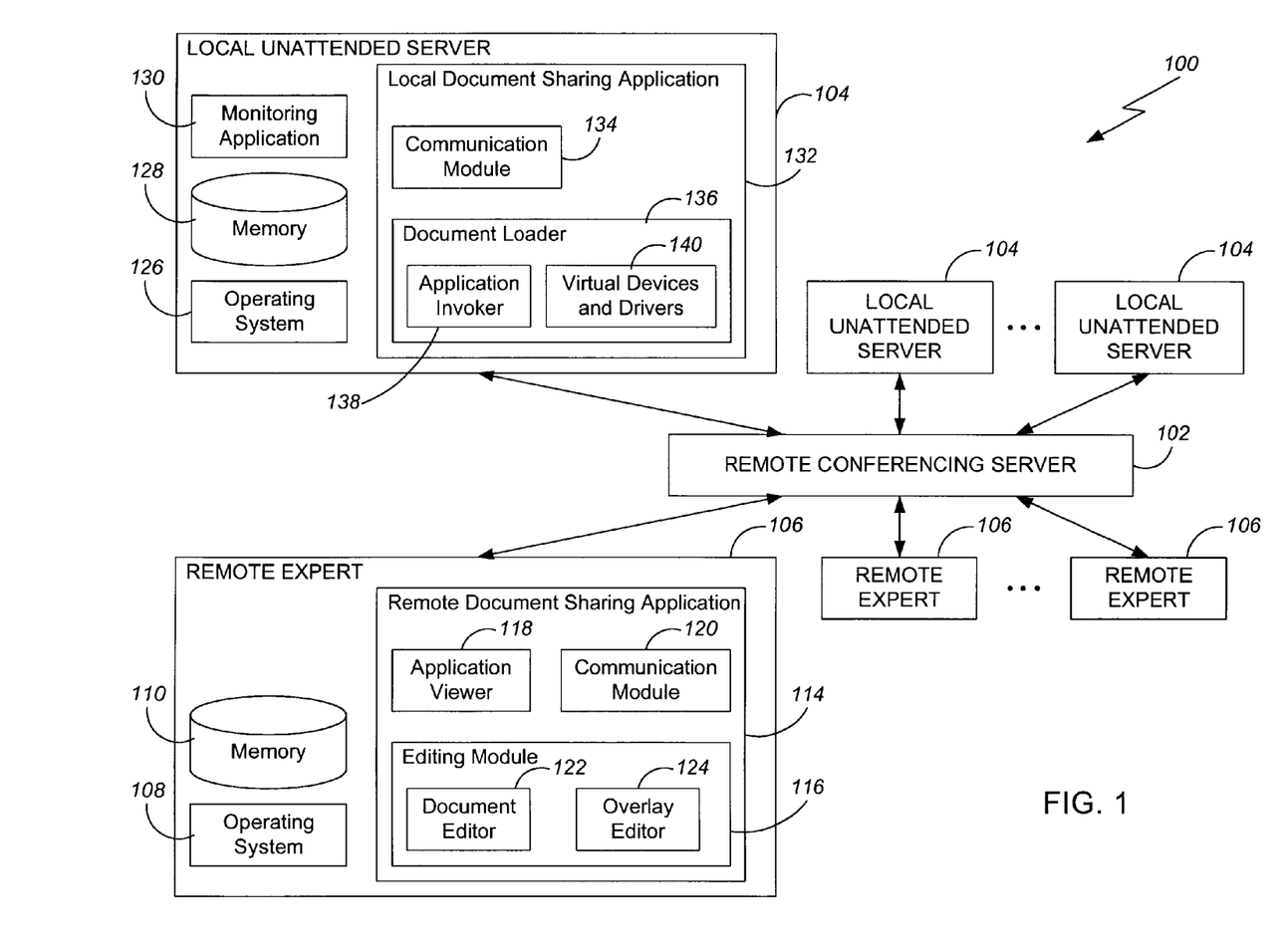
FIG. 1 depicts an example client-server system in which the present invention may be used.

FIG. 1 shows a client-server computer system 100 including a remote conferencing server 102, a plurality of local unattended servers 104, and a plurality of remote experts 106. One key advantage of using a client-server architecture for the system 100 rather than a peer-to-peer architecture is that no client (local unattended server 104 and remote expert 106) is burdened with communicating with all of the other clients. Each client (local unattended server 104 and remote expert 106) merely communicates with the remote conferencing server 102. This advantage permits the system 100 to be highly scalable, for example, to enable multiple remote experts 106 to monitor multiple local unattended servers 104.

Each remote expert 106 includes an operating system 108, a memory 110, and a remote document sharing application 114. In one implementation, the remote expert 106 is a computer running a Windows-type operating system (OS) that has a web browser such as Windows Internet explorer. The remote document sharing application 114 can be a browser plug-in that is downloaded from the Internet and stored in the memory 110. The remote document sharing application can include an editing module 116, a viewer application 118 and a communication module 120. The editing module can include a document editor 122 and an overlay editor 124. The functions of these elements will be described in greater detail below.

The local unattended server 104 includes an operating system 126, a memory 128, a monitoring application 130, and a local document sharing application 132. In one implementation, the local unattended server 104 runs a Windows-type operating system (OS). To provide for interaction with a user, the local unattended server can include a display device, such as a monitor or LCD screen, for displaying information to the user, and a keyboard and a pointing device, such as a mouse or a trackball, by which the user can provide input to the local unattended server. The local unattended server can be programmed to provide a graphical user interface through which applications interact with users. For example, the local unattended server can be programmed to launch a desktop application stored in the memory 128 to provide, as the graphical user interface to the OS, a desktop having one or more icons representing commands, files or windows. The monitoring application 130 monitors the status of one or more applications running on the local unattended server 104. Methods for monitoring applications are well known in the relevant arts. The monitoring application 130 can be configured to generate and send an event flag identifying a running application that may require external support to the remote conferencing server 102. The local document sharing application can include a communication module 134 and a document loader 136. The document loader can have an application invoker 138 and virtual devices and drivers 140. The functions of these elements will be described in greater detail below.

In one implementation, the remote conferencing server 102 uses communications protocols, such as the H.323 protocols and the T.120 protocols (established by the International Telecommunications Union), to provide support for real-time, multipoint data communications across IP-based networks, including the Internet. The remote conferencing server 102 can establish a data conference that enables collaboration, such as application sharing and document sharing, between multiple remote experts 106.

Figure 4A:
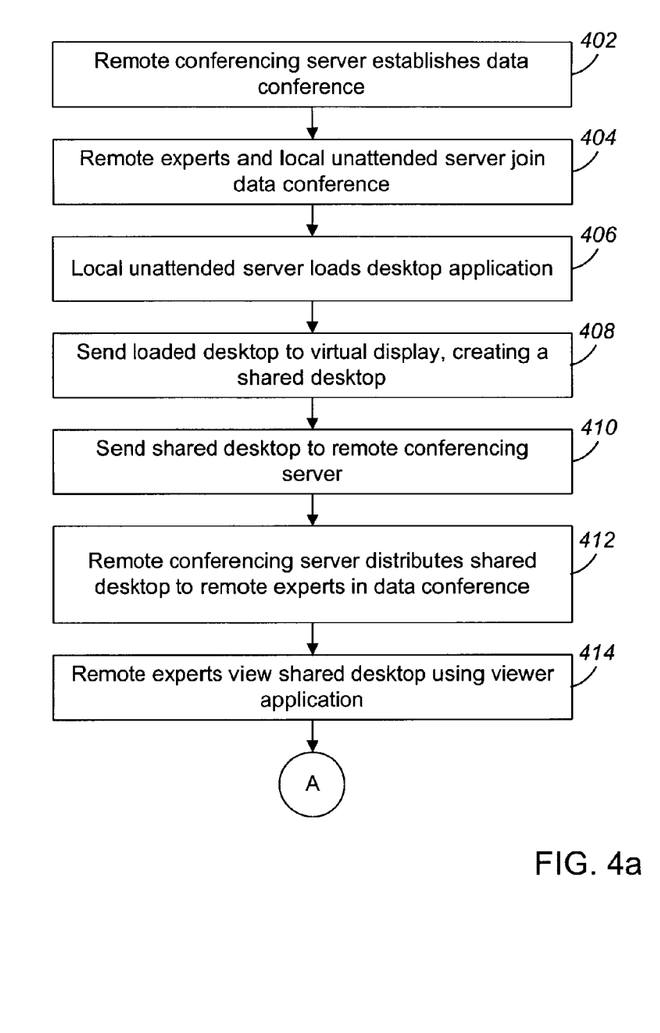
FIGS. 4a and 4b are flow charts of the operation of a remote control of a local unattended server.

Referring to FIGS. 1 and 4a, the remote conferencing server 102 can automatically establish a data conference (step 402) upon receipt of the event flag and send information regarding the data conference to the local unattended server 104, which uses the information to join the data conference (step 404). The remote conferencing server 102 then notifies select remote experts 106 that a data conference of interest has been established and allows only the select remote experts 106 to join the data conference (step 404). Alternatively, the remote conferencing server 102 notifies all the remote experts 106 that the data conference has been established. In this implementation, the remote experts 106 have to monitor the list of data conferences on the remote conferencing server 102 and select the data conference to join (step 404).

Figure 2:
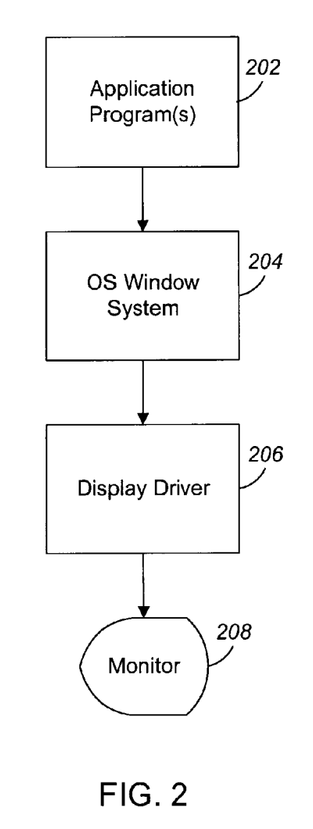
FIG. 2 depicts the software layers in a structured system environment.

Before proceeding to the discussion of an unattended desktop sharing mode, the software layers in a structured system programming environment such as Microsoft Windows are explained. FIG. 2 depicts the software layers in a typical structured system programming environment, such as MICROSOFT® Windows. Typically in this environment, a running application 202 (including the desktop application) interfaces with input and output devices strictly through the operating system's Window system environment, represented by OS Window system 204. When the application requests the OS Window system to write a character to a display screen, the OS Window system directs a display driver 206 to write the character to a display device, such as a monitor 208. A driver such as the display driver 206 is a software program written specifically to handle a specific device or device type. For example, there are several standards of display resolution with computer monitors. A display driver is needed for each standard in order to control and interface with each type of monitor.

The display driver 206 tells the monitor 208 specifically how to write a character on the display screen. For example, in an application, such as a word processor running on top of the OS Window system 204, when the user inputs a character "a" from the keyboard and when the word processor receives the character "a" as input, the word processor will display the character "a" on the display screen at the right place to reassure the user that he or she has input a character "a". To write the character "a" to the display screen, the word processor calls a OS Window system 204 write-to-screen routine, specifying the character "a" and the location on the display screen to place the character. The OS Window system 204 routine in turn calls the display driver 206 with the given information, and the display driver 206 specifically tells the display screen the placement of dots on the display screen to compose the visual image resembling the character "a".

Referring to FIGS. 1, 3, 4a and 4b, in the unattended desktop sharing mode, the software layers in the structured system programming environment are modified such that the application calls are directed to a virtual driver—a virtual printer driver 304 and a virtual display driver 306, for example—rather than a physical display driver 206. In one implementation, the redirection of the application calls is accomplished by renaming the appropriate OS Window System 204 calls with predefined alternate calls and naming the virtual drivers to the OS Window system's original calls. When the application calls the OS Window System 204 via its name, it is calling the virtual driver rather than the OS Window System 204.

For example, when a remote expert 106 joins the data conference (step 404), the local unattended server 104 automatically assigns control of itself to the remote expert 106. To accomplish this, the local document sharing application 132 first converts the desktop of the local unattended server 104 to a document form ("loaded desktop") by "loading" the desktop application (stored in the memory 128) using the document loader 136 (step 406). In one implementation, the application invoker 138 in the document loader 136 employs automatic application association to select a file editing application 302 (see, FIG. 3) associated with the desktop application based on associations established by the operating system according 126 to methods well-known in the relevant arts. If the file editing application 302 is already running, the desktop application is opened using the file editing application 302. However, if the file editing application 302 is not running, the file editing application 302 is launched first. The loaded desktop can then be sent to the virtual display device 306 to generate a shared desktop 310a (step 408). In one implementation, a transparent overlay screen is simultaneously generated for display over the shared desktop 310a. The shared desktop 310a is passed to the remote conferencing server 102 (step 410) for distribution to the remote experts 106 in the data conference (step 412). The file editing application 302 may then be closed. Each remote expert 106 receives the shared desktop 310a via its communication module 120. Methods for exchanging such data are discussed in U.S. Pat. No. 5,623,603, assigned to the assignee of the present application, and the disclosure of which is incorporated herein by reference in its entirety. The viewer application 118 allows a user of the remote expert 106 to view the shared desktop 310a (step 414).

Figure 3:
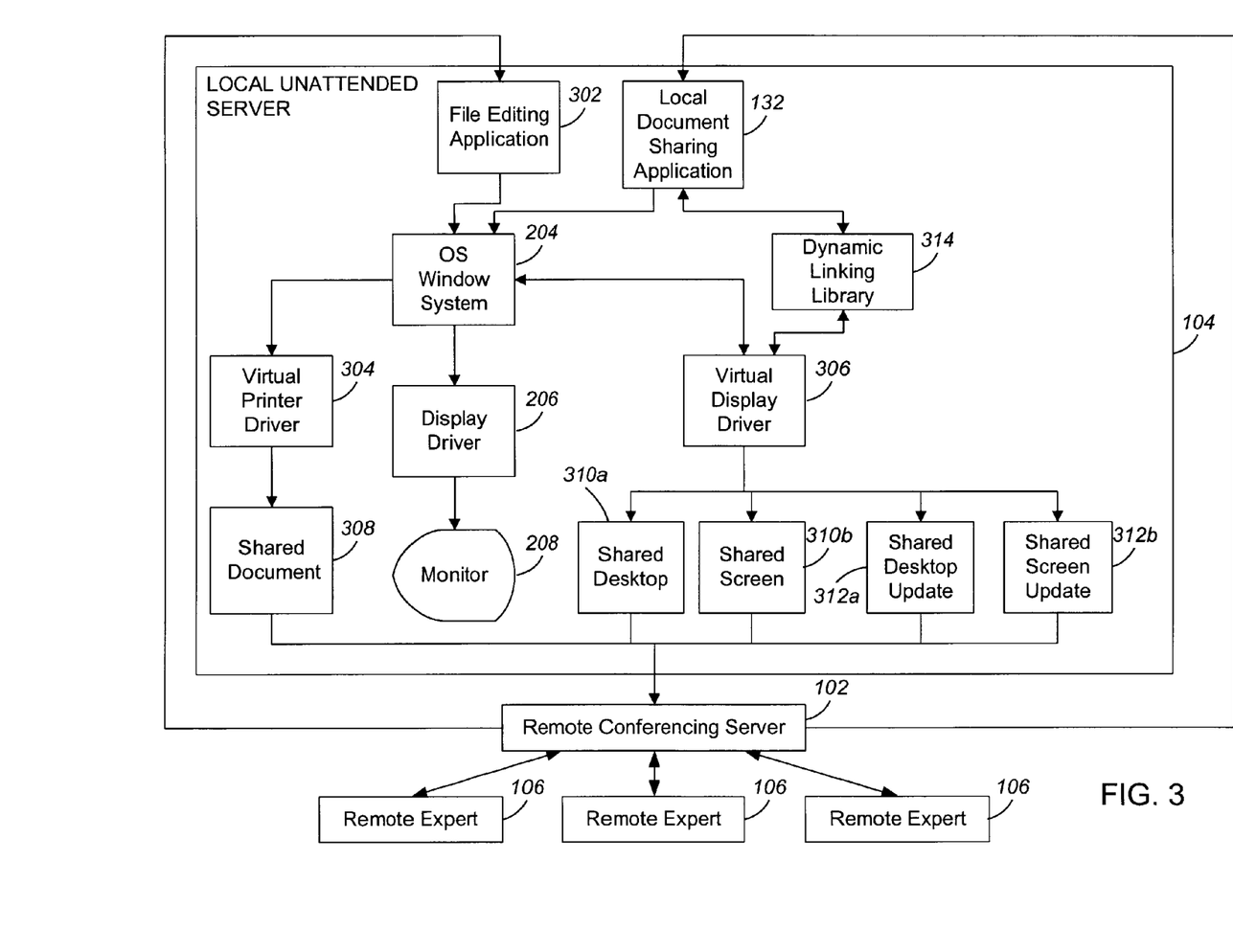
FIG. 3 depicts the software layers in a structured system environment as modified by one implementation of the present invention.
Figure 4B:
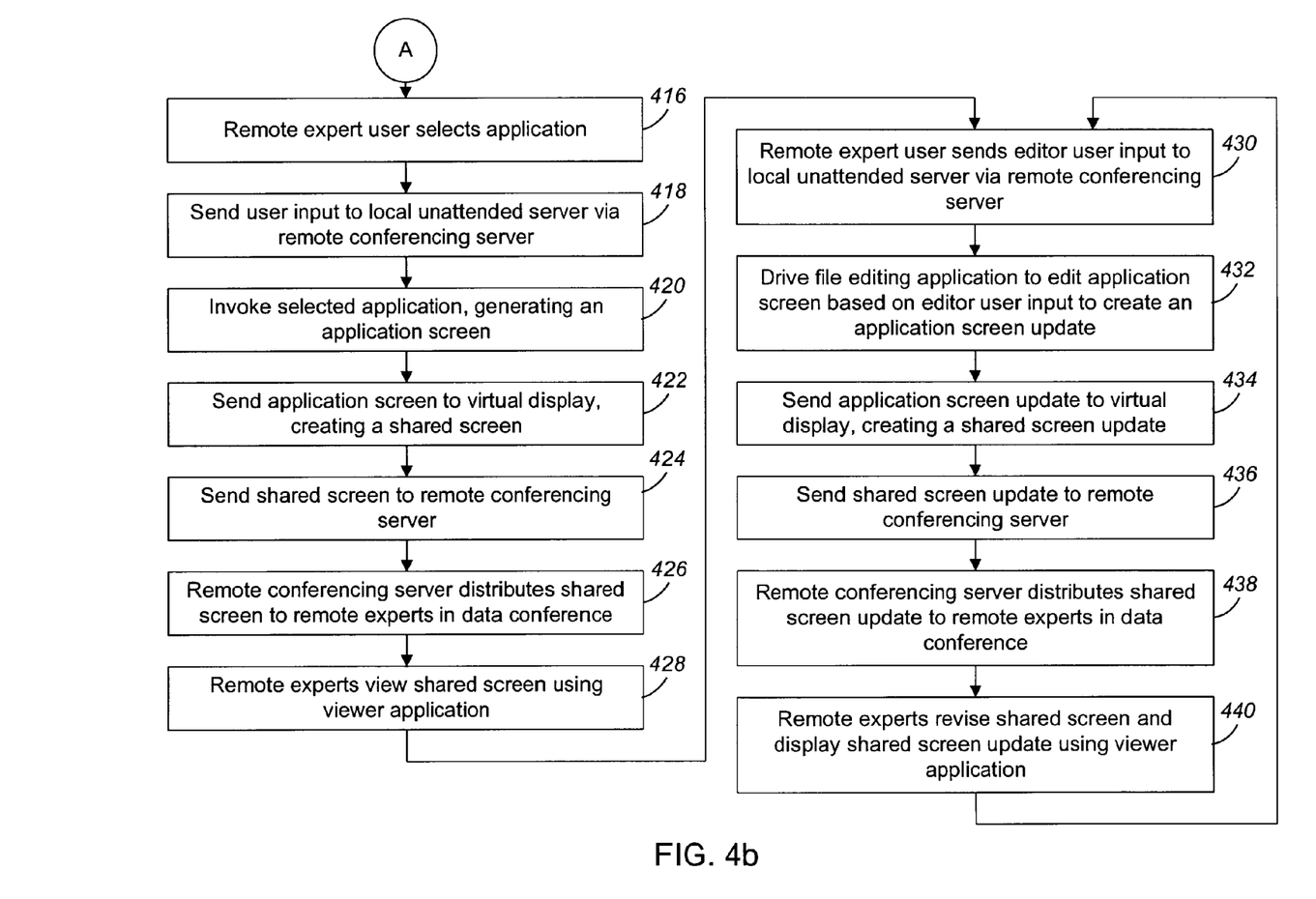

Referring to FIG. 4b, if desired, a remote expert user can select to run an application—a word processing application, for example—installed on the local unattended server 104 (step 416). In one implementation, the remote expert user double-clicks on an icon, displayed on the shared desktop, representing the selected application. The user input is sent to the local unattended server 104 via the remote conferencing server 102 (step 418). In response, the file editing application 302 associated with the selected application is invoked, which generates an application screen (step 420) that can be sent to a virtual display driver 306 (see, FIG. 3), thereby generating a shared screen 310b (step 422). In one implementation, a transparent overlay screen is simultaneously generated for display over the shared screen 310b. The shared screen 310b having the transparent overlay screen can then be sent to the remote conferencing server 102 (step 424) for distribution to the remote experts 106 in the data conference (step 426). The remote experts 106 in the data conference display the shared screen 310b using their respective viewer applications 118 (step 428).

The system 100 can be configured to permit some, or alternatively, all of the remote experts 106 in the data conference to control the file editing application 302 associated with the desktop application or the selected application to edit the loaded desktop or the application screen, respectively. It should be noted that the term "edit" refers to any changes that can be made to the loaded desktop or the application screen. For example, a remote expert user can edit the loaded desktop to rearrange the positions of the icons displayed in the shared desktop. Alternatively, if a word processing application was previously launched and a word processing document is currently displayed on each remote expert's viewer application 118, a remote expert user can edit the word processing application screen to change the font size of the displayed word processing document, for example. The editor user input generated by the remote expert user can be sent to the file editing application 302 via the remote conferencing server 102 (step 430). In one implementation, the editor user input drives the file editing application 302 to edit the loaded desktop based on the editor user input. In response, the file editing application 302 generates a loaded desktop update, which is sent to the virtual display driver 306, thereby creating a shared desktop update 312a. In an alternative implementation, the editor user input drives the file editing application 302 to edit the current application screen based on the editor user input. In response, the file editing application 302 generates an application screen update (step 432), which is sent to the virtual display driver 306, thereby creating a shared screen update 312b (step 434).

In one implementation, the virtual display driver 306 reports the shared screen updates 312b to the local document sharing application 132 via a dynamic linking library 314. When the shared screen updates 312b are finished, the local document sharing application 132 reads the shared screen updates 312b stored in the dynamic linking library 314 and forwards a compiled shared screen update 312b to the remote conferencing server 102 (step 436). The remote conferencing server 102 distributes the compiled shared screen update 312b to the remote experts 106 in the data conference (step 438). Each remote expert 106 revises the current shared screen 310b using the shared screen update 312b, and displays the revised shared screen using its viewer application 118 (step 440). The process is repeated at step 430 as needed for user input from the remote experts 106. Alternatively, a similar process can be implemented to update a shared desktop 310a.

Referring to FIG. 3, if desired, a remote expert user can select a document—a MICROSOFT® Word document, for example—located on the local unattended server to "share" with the other remote expert users in the data conference. When a document is "shared", a representation of the entire document is sent to each remote expert's viewer application 118. In one implementation, this is accomplished by using a virtual printer driver 304, rather then the virtual display driver 306. The document to be "shared" is printed to the virtual printer to create a shared document 308, in a predefined format. Typically, the predefined format is different from the native format of the document. As a result, the shared document 308 can be displayed independent of the original application associated with the document, i.e., the MICROSOFT® Word application does not need to be launched in order for a remote expert user to view a shared document created from a MICROSOFT® Word document. A transparent overlay screen can be simultaneously generated for display over the shared document 308. The shared document 308 having the transparent overlay screen can then be sent to the remote conferencing server 102 for distribution to the remote experts 106 in the data conference. The remote experts 106 in the data conference display the shared document 308 using their respective viewer applications 118.

Each remote expert user can create, manipulate and delete annotation objects on the transparent overlay screen overlaying the shared desktop 310a, the shared desktop update 312a, the shared screen 310b, the shared screen update 312b or the shared document 308 displayed on their respective viewer applications 118. The remote expert user can transfer and share information with other remote expert users via the remote conferencing server 102. Annotating the transparent overlay screen and sending data representing the annotation objects from one remote computer to other remote computers, where the annotation objects are drawn on each display, is discussed in U.S. Pat. No. 5,577,188, assigned to the assignee of the present application, and the disclosure of which is incorporated herein by reference in its entirety. In annotation mode, the remote document sharing application 114 checks for overlapping screen objects and re-draws the annotation objects if necessary. This process is fully explained in U.S. Pat. No. 5,577,188.

The present invention may be implemented using hardware, software or a combination thereof and may be implemented in a computer system or other processing system. In fact, in one embodiment, the invention is directed toward one or more computer systems capable of carrying out the functionality described herein. An example computer system includes one or more processors. The processor is connected to a communication bus. Various software embodiments are described in terms of this example computer system. After reading this description, it will become apparent to a person skilled in the relevant art how to implement the invention using other computer systems and/or computer architectures.

Computer system also includes a main memory, preferably random access memory (RAM), and can also include a secondary memory. The secondary memory can include, for example, a hard disk drive and/or a removable storage drive, representing a floppy disk drive, a magnetic tape drive, an optical disk drive, etc. The removable storage drive reads from and/or writes to a removable storage unit in a well known manner. Removable storage unit, represents a floppy disk, magnetic tape, optical disk, etc. which is read by and written to by removable storage drive. As will be appreciated, the removable storage unit includes a computer usable storage medium having stored therein computer software and/or data.

In alternative embodiments, secondary memory may include other similar means for allowing computer programs or other instructions to be loaded into computer system. Such means can include, for example, a removable storage unit and an interface. Examples of such include a program cartridge and cartridge interface (such as that found in video game devices), a removable memory chip (such as an EPROM, or PROM) and associated socket, and other removable storage units and interfaces which allow software and data to be transferred from the removable storage unit to computer system.

The computer system can also include a communications interface. Communications interface allows software and data to be transferred between the computer system and external devices. Examples of communications interface can include a modem, a network interface (such as an Ethernet card), a communications port, a PCMCIA slot and card, etc. Software and data transferred via communications interface are in the form of signals which can be electronic, electromagnetic, optical or other signals capable of being received by communications interface. These signals are provided to communications interface via a channel. This channel carries signals and can be implemented using wire or cable, fiber optics, a phone line, a cellular phone link, an RF link and other communications channels.

In this document, the terms "computer program medium" and "computer usable medium" are used to generally refer to media such as removable storage device, a hard disk installed in hard disk drive, and signals. These computer program products are means for providing software to computer system.

Computer programs (also called computer control logic) are stored in main memory and/or secondary memory. Computer programs can also be received via communications interface. Such computer programs, when executed, enable the computer system to perform the features of the present invention as discussed herein. In particular, the computer programs, when executed, enable the processor to perform the features of the present invention. Accordingly, such computer programs represent controllers of the computer system.

In an embodiment where the invention is implemented using software, the software may be stored in a computer program product and loaded into computer system using removable storage drive, hard drive or communications interface. The control logic (software), when executed by the processor, causes the processor to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s). In yet another embodiment, the invention is implemented using a combination of both hardware and software.

While various embodiments of the present invention have been described above, it should be understood that they have been presented by way of example, and not limitation. It will be apparent to persons skilled in the relevant art that various changes in form and detail can be placed therein without departing from the spirit and scope of the invention. Thus the present invention should not be limited by any of the above-described example embodiments, but should be defined only in accordance with the following claims and their equivalents.

What is claimed is:

1. A method for assigning control of a local computer system to one or more remote computer systems, the method comprising:

providing a monitoring application and a desktop application on the local computer system, the monitoring application monitoring the status of one or more applications running on the local computer system; the desktop application providing a desktop with access to all commands, files, or applications on the local computer system;

the monitoring application generating an event flag identifying an application on the local computer system requiring technical support and sending the event flag to a remote conferencing server;

in response to receiving the event flag, the remote conferencing server automatically establishing a data conference with the local computer system, and notifying the one or more remote computer systems that the data conference with the local computer system has been established; and automatically assigning control of the local computer system to the one or more remote computer systems in response to the one or more remote computers joining the data conference, the one or more remote computer systems providing the technical support for the identified application including controlling the desktop application on the local computer system; and displaying the desktop of the local computer system at each remote computer system through a respective viewer application during the data conference.

2. The method of claim 1, wherein automatically assigning control of the local computer system to the one or more remote computer systems includes:

loading the desktop application on the local computer system and generating a loaded desktop, the loaded desktop being the desktop converted into a document form;

sending the loaded desktop to a virtual device, the virtual device creating a shared desktop for use during the control of the local computer system by the one or more remote computer systems;

sending the shared desktop to the remote conferencing server for distribution to the one or more remote computer systems; and displaying the shared desktop at each remote computer system through a respective viewer application during the data conference, wherein the shared desktop represents the desktop of the local computer system.

3. The method of claim 2, wherein sending the loaded desktop to a virtual device comprises:

replacing a default device driver with a virtual device driver associated with the virtual device.

4. The method of claim 2, further comprising:

receiving a user input at the local computer system from a remote computer system;

driving a file editing application associated with the desktop application to edit the loaded desktop based on the user input;

receiving a loaded desktop update from the file editing application, the loaded desktop update occasioned by the editing of the loaded desktop;

sending the loaded desktop update to the virtual device, the virtual device creating a shared desktop update; and sending the shared desktop update to the remote conferencing server for distribution to the one or more remote computer systems, each remote computer system updating the display of the shared desktop by a respective viewer applications.

5. The method of claim 4, wherein the shared desktop update represents only the portion of the loaded desktop that was edited.

6. The method of claim 2, further comprising:

creating a transparent overlay screen appearing to be displayed over the shared desktop.

7. The method of claim 6, further comprising:

creating a user-defined object at a user-specified position within the transparent overlay screen at a remote computer system; and sending data representing the user-defined object and user-specified position from the remote computer system to the remote conferencing server for distribution to other ones of the one or more remote computers systems, wherein the transparent overlay screen is updated to display the user-defined object at the user-specified position within the transparent overlay screen by the respective viewer applications.

8. The method of claim 2, further comprising:

receiving a first user input, at the local computer system from a remote computer system selecting the identified application;

invoking the selected application on the local computer system in response to the first user input to generate an application screen;

sending the application screen to the virtual device, the virtual device creating a shared screen;

sending the shared screen to the remote conferencing server for distribution to the one or more remote computers systems; and displaying the shared screen at each remote computer system by a respective viewer application.

9. The method of claim 8, further comprising:

receiving a second user input at the local computer system from a remote computer system;

driving a file editing application associated with the selected application to edit the application screen based on the second user input;

receiving an application screen update from the file editing application, the application screen update occasioned by the editing of the application screen;

sending the application screen update to the virtual device, the virtual device creating a shared screen update; and sending the shared screen update to the remote conferencing server for distribution to the one or more remote computer systems, each remote computer system updating the display of the shared screen by a respective viewer application.

10. The method of claim 2, wherein the local computer system is a local server.

11. The method of claim 2, wherein the local computer system is connected to a network and the one or more remote computer systems are located outside of the network.

12. The method of claim 1, further comprising:

receiving a user input at the local computer system from a remote computer system selecting a document on the local computer system;

printing the document to a virtual printer, the virtual printer creating a shared document;

sending the shared document to the remote conferencing server for distribution to the one or more remote computers systems; and displaying the shared document at each remote computer system by a respective viewer application.

13. The method of claim 12, further comprising:

creating a transparent overlay screen appearing to be displayed over the shared document.

14. The method of claim 13, further comprising:

creating a user-defined object at a user-specified position within the transparent overlay screen at a remote computer system;

sending data representing the user-defined object and user-specified position from the remote computer to the remote conferencing server for distribution to the one or more remote computers, wherein the transparent overlay screen is updated to display the user-defined object at the user-specified position within the transparent overlay screen at each remote computer system by a respective viewer application.

15. The method of claim 1, wherein the local computer system includes a display device for displaying information to a user and includes a keyboard by which the user can provide input to the local computer system.

16. The method of claim 1, wherein the local computer system is a local server.

17. The method of claim 1, wherein the local computer system is unattended in which there is not a user present to interact with the local computer system.

18. The method of claim 1, wherein the local computer system is connected to a network and the one or more remote computer systems are located outside of the network.

19. A computer program product stored on a machine-readable medium for assigning control of a local computer system to one or more remote computer systems, the product comprising instructions operable to cause a programmable processor to:

provide a monitoring application and a desktop application on the local computer system, the monitoring application monitoring the status of one or more applications running on the local computer system, the desktop application being operable to provide a desktop with access to all commands, files, or applications on the local computer system;

the monitoring application being operable to generate an event flag identifying an application on the local computer system requiring technical support, and to send the event flag to a remote conferencing server;

the remote conferencing server being operable to automatically establish a data conference with the local computer system in response to receiving the event flag, and to notify the one or more remote computer systems that the data conference with the local computer system has been established; and automatically assign control of the local computer system to the one or more remote computer systems in response to the one or more remote computers joining the data conference, the one or more remote computer systems being operable to provide the technical support for the identified application and to control the desktop application on the local computer system; and display the desktop of the local computer system at each remote computer system through a respective viewer application during the data conference.

20. The product of claim 19, wherein the instruction to automatically assign control of the local computer system to the one or more remote computer systems includes instructions operable to cause a processor to:

load the desktop application on the local computer system and generate a loaded desktop, the loaded desktop being the desktop converted into a document form;

send the loaded desktop to a virtual device, the virtual device being operable to create a shared desktop for use during the control of the local computer system by the one or more remote computer systems;

send the shared desktop to the remote conferencing server for distribution to the one or more remote computer systems; and display the shared desktop at each remote computer system through a respective viewer application during the data conference, wherein the shared desktop represents the desktop of the local computer system.

21. The product of claim 20, wherein the instructions to send the loaded desktop to a virtual device comprises instructions operable to cause a programmable processor to:

replace a default device driver with a virtual device driver associated with the virtual device.

22. The product of claim 20, further comprising instructions operable to cause a programmable processor to:

receive a user input at the local computer system from a remote computer system;

drive a file editing application associated with the desktop application to edit the loaded desktop based on the user input;

receive a loaded desktop update from the file editing application, the loaded desktop update occasioned by the editing of the loaded desktop;

send the loaded desktop update to a virtual device, the virtual device being operable to create a shared desktop update; and send the shared desktop update to the remote conferencing server for distribution to the one or more remote computer systems, each remote computer system being operable to update the display of the shared desktop by a respective viewer applications.

23. The product of claim 22, wherein the shared desktop update represents only the portion of the loaded desktop that was edited.

24. The product of claim 20, further comprising instructions operable to cause a programmable processor to:

create a transparent overlay screen appearing to be displayed over the shared desktop.

25. The product of claim 24, further comprising instructions operable to cause a programmable processor to:

create a user-defined object at a user-specified position within the transparent overlay screen at a remote computer; and send data representing the user-defined object and user-specified position from the remote computer to the remote conferencing server for distribution to the one or more remote computers, wherein the transparent overlay screen is updated to display the user-defined object at the user-specified position within the transparent overlay screen by the respective viewer applications.

26. The product of claim 20, further comprising instructions operable to cause a programmable processor to:

receive a first user input at the local computer system from a remote computer system selecting the identified application;

invoke the selected application on the local computer system in response to the first user input to generate an application screen;

send the application screen to the virtual device, the virtual device being operable to create a shared screen;

send the shared screen to the remote conferencing server for distribution to the one or more remote computer systems; and display the shared screen at each remote computer by a respective viewer application.

27. The product of claim 26, further comprising instructions operable to cause a programmable processor to:

receive a second user input at the local computer system from a remote computer system;

drive a file editing application associated with the selected application to edit the application screen based on the second user input;

receive an application screen update from the application, the application screen update occasioned by the editing of the application screen;

send the application screen update to the virtual device, the virtual device being operable to create a shared screen update; and send the shared screen update to the remote conferencing server for distribution to the one or more remote computer system, each remote computer system being operable to update the display of the shared screen by a respective viewer application.

28. The product of claim 19, the product further comprising instructions operable to cause a programmable processor to:

receive a user input at the local computer system from a remote computer system selecting a document on the local computer system;

print the document to a virtual printer, the virtual printer being operable to create a shared document;

send the shared document to the remote conferencing server for distribution to the one or more remote computer systems, and display the shared document at each remote computer system by a respective viewer application.

29. The product of claim 28, further comprising instructions operable to cause a programmable processor to:

create a transparent overlay screen appearing to be displayed over the shared document.

30. The product of claim 29, further comprising instructions operable to cause a programmable processor to:

create a user-defined object at a user-specified position within the transparent overlay screen at a remote computer system;

send data representing the user-defined object and user-specified position from the remote computer to the remote conferencing server for distribution to the one or more remote computers, wherein the transparent overlay screen is updated to display the user-defined object at the user-specified position within the transparent overlay screen at each remote computer by a respective viewer application.

31. The product of claim 19, wherein the local computer system is a local server.

32. The product of claim 19, wherein the local computer system is unattended in which there is not a user present to interact with the local computer system.

33. The product of claim 19, wherein the local computer system is connected to a network and the one or more remote computer systems are located outside of the network.

34. A system for controlling a local computer system with one or more remote computer systems, comprising:

a local computer system having a display and an input device to interact with a user, and having a desktop application providing a desktop for the display with access to all commands, files, or applications on the local computer system;

a remote conferencing server to send a conferencing request to the local computer system, the conferencing request containing information regarding a data conference;

the local computer system to receive the conferencing request from the remote conferencing server and join the data conference, the remote conferencing server to notify one or more remote computer systems that the local computer system has joined the data conference;

the local computer system to automatically assign control of itself to the one or more remote computer systems upon an event of the one or more remote computers joining the data conference, wherein each of the one or more remote computer systems are operable to control the local computer system including the desktop application during the data conference, and display the desktop of the local computer system by a respective viewer application.

* * * * *